United States Patent
Farrelly et al.

(12) 
(10) Patent No.: US 6,874,948 B2
(45) Date of Patent: Apr. 5, 2005

(54) SYSTEM, METHOD AND APPARATUS FOR FIBER BONDING PROCEDURE FOR OPTOELECTRONIC PACKAGING

(75) Inventors: Mark Brian Farrelly, San Jose, CA (US); Theodore David Bennett, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 290 days.

(21) Appl. No.: 10/077,530

(22) Filed: Feb. 14, 2002

(65) Prior Publication Data

US 2002/0110331 A1 Aug. 15, 2002

Related U.S. Application Data

(60) Provisional application No. 60/268,631, filed on Feb. 14, 2001.

(51) Int. Cl.[7] .............................. G02B 6/30; G02B 6/26; G02B 6/36
(52) U.S. Cl. .............................. 385/88; 385/49; 385/50; 385/51; 385/89; 385/90; 385/91; 385/92; 385/93; 385/95; 385/96; 385/97

(58) Field of Search .......................... 385/49–51, 88–93, 385/95–97

(56) References Cited

U.S. PATENT DOCUMENTS

| | | | | | |
|---|---|---|---|---|---|
| 4,515,432 | A | * | 5/1985 | Sherwin | 385/49 |
| 6,065,881 | A | * | 5/2000 | Okada et al. | 385/88 |
| 6,516,121 | B2 | * | 2/2003 | Laor | 385/49 |

* cited by examiner

*Primary Examiner*—Brian Healy
*Assistant Examiner*—Mary El-Shammaa
(74) *Attorney, Agent, or Firm*—Charles Berman, Esq.; Greenberg Traurig, LLP

(57) ABSTRACT

A method and apparatus for bonding optical fibers are disclosed. A fiber bonding device feeds an optical fiber through a supportive sheath having a ceramic tip at its end. The optical fiber extends slightly beyond the ceramic tip and is aligned with the focal point of a laser, which causes the end of the optical fiber to melt, forming a molten region. The ceramic tip then extends partially into a substrate surface, causing the molten region of the optical fiber to become bonded to the substrate. The process is controlled by computer logic, such that it is an automated, precision process for bonding optical fibers.

25 Claims, 1 Drawing Sheet

SYSTEM, METHOD AND APPARATUS FOR FIBER BONDING PROCEDURE FOR OPTOELECTRONIC PACKAGING

RELATED APPLICATIONS

This Application claims priority to U.S. Provisional Application No. 60/268,631 filed Feb. 14, 2001, the contents of which are incorporated herein by reference.

BACKGROUND OF THE INVENTION

1. Field of the Invention

This invention relates generally to a method for optical fiber bonding. More particularly, the present invention relates to a method for bonding an optical fiber directly to a substrate. The inventive direct bond includes only the optical fiber and the substrate; no other adhering or connection components are required.

2. General Background and State of the Art

In recent years, there have been significant developments in the field of optical communications. For example, while a decade ago, communications lines transmitted data in a single wavelength signal, today's scientists are able to transmit 80–160 colors at once through a single fiber. Not only has the amount of data that can be transferred increased, but, the speed at which this data is carried has also increased, with reports of speeds as high as 10 gigabits per second.

It is anticipated that data transfer by existing electrical computing systems using metallic connections will be replaced by totally optical systems using light impulses. Optical technologies are already widespread in such areas as medical equipment. For example, surgeons are now capable of doing non-invasive heart bypasses from a remote location using optical equipment. The optical link provides the necessary connection speeds to make this possible. Currently, the optical fibers to emitter connections are made with mechanical couplers, or micro-machined sleeves containing fibers inserted into holes using an adhesive. Unfortunately, these connections require manual processes that will prohibit making these connections on a large scale. Developing a new and improved optical fiber bonding process will translate to faster, more efficient and cost-effective technologies. However, these developments have been quite limited and hindered, for a variety of reasons.

While generating electrical impulses for high-speed metal connections has been developed for years and is widely used, optical systems require light impulses rather than electrical impulses. These light impulses must be generated at a very high speed in order to sustain reliable transfer of data over glass fibers in totally optical systems. Other considerations and limitations in light generation include reliability, size, efficiency and cost. In view of these considerations semiconductor lasers are ideal candidates for the task.

Semiconductor lasers are becoming the industry choice for light generation in optical data transfer. Existing optical technologies are being developed and used in many systems including telecommunication switching systems, avionics devices and communication between supercomputers and mass data storage devices. Additionally, optical technology is currently being tested for other applications including totally optical personal computers.

To date, there are two main types of semiconductor lasers: in plane, edge emitting lasers (IPLs) and out-of-plane, vertically emitting lasers. IPLs employ reflection of light back and forth in the plane of the wafer that they are produced on. IPLs are used extensively and can be very effective in some applications. Vertical Cavity Surface Emitting Lasers (VCSELs) are semiconductor lasers that emit light normal to the plane of the wafer.

There are many advantages of vertical emission lasers when compared to IPLs. For example, VCSELs are ideal for large scale array fabrication. In contrast to IPLs, where the wafer must be cleaved before the array is functional, VCSELs propagate light out of the plane of the wafer so arrays of lasers can be immediately fabricated. Additionally, each individual VCSEL can be pre-tested on the wafer prior to the expensive and difficult task of separating the wafer into microchips. Another advantage of VCSELs is that defective lasers are immediately detected and discarded without expending additional time and money associated with the separation process.

Another advantage of VCSELs is the fact that they have a circular shape and contain low-numerical aperture output beams. This enables the output to be coupled to optical fibers with ease and with a high coupling efficiency. In contrast, IPLs emit a wide elliptical beam that expands quickly as it moves away from the laser, making it difficult to achieve high coupling efficiency with optical fibers.

Also, IPL beams require additional optical components to couple the output to a fiber, and additional components are expensive and cumbersome to incorporate into a system. Moreover, the vertical nature of VCSEL output yields less stringent fabrication tolerances. For example, variations in fiber thickness are not a problem using VCSELs because of the vertical output nature, while thickness variations affect alignment of fibers in IPLs. This is a significant advantage of VCSELs, since variations in thickness of oxide growth layers on the wafer can occur during fabrication. Lastly, in contrast to IPLs, which need to be placed on the edge of a microchip, VCSELs can be placed at any location on a microchip. Since IPLs have to be on the edge of a microchip, they effectively increase the overall size of an array.

Thus, IPLs limit the flexibility of integrating semiconductor lasers into all types of components. However, vertical emission lasers (VCSELs) can be incorporated into a wide range of products including totally optical personal computers. Moreover, VCSELs are fabricated in place on the same wafer as the electrical circuitry, enabling "one-step" fabrication of complete systems on a single microchip. Using the technology developed for producing the integrated circuit, fabrication techniques allow designers to incorporate the semiconductor lasers and the electronics that control them. The electronics are fabricated using photolithography and thin film metal deposition steps. The lasers are fabricated by growing oxide layers and deposited material on the same chip in a temperature and humidity controlled environment.

In addition to suitable semiconductor lasers, advances in data transmission using optical systems also require that the lasers are coupled to optical fibers. Achieving a suitable and reliable coupling has proved difficult. Holm et al., have developed a silicon coupler mechanism for coupling fibers to VCSELs by etching 125 micron holes in the silicon wafer using deep reactive ion etching (DRIE) (Holm, J. et al., 2000, *Actuators*, 82,245–248). The DRIE method is a micromachining process that makes holes that are conical shaped, with a slightly larger diameter at the bottom of the wafer. Correspondingly, a 125-micron diameter fiber is inserted and glued to the 125-micron circular shaped bottom of the silicon wafer. The conical shape acts as a guide while the exact 125 micron diameter ensures accurate alignment of the fiber. Then using standard surface micro machining, electrodes and solder pads are produced on the top surface of the silicon wafer. The electrodes facilitate the power to the semiconductor lasers and the solder pads mount the lasers themselves onto the wafer.

Unfortunately, a significant drawback of Holm's silicon coupler is its manner of fiber placement. Most laser devices contain mirrors. In order to avoid damaging these mirrors, the fibers have to be inserted prior to mounting the lasers. However, because fibers protrude out, insertion of fibers prior to mounting the laser becomes difficult. Conversely, if the laser is mounted first, then extreme care and precision must be used to insert the fiber. To resolve this obstacle, Holm et al., bond a silicon "lid" to the top surface of the silicon wafer. This lid contains etched holes of 50-micron diameter, located in the center of the 125-micron holes on the silicon wafer. Again, the DRIE micro-machining process performs etching. The lid functions as a stop for the 125-micron diameter fiber. The lid also provides a more stable system by allowing the solder pads to be placed closer to the center of the laser. Unfortunately, a significant disadvantage of this modification is that the aperture of the fiber is now limited because it is partially covered by the lid.

Another problematic issue is the manual process of inserting and gluing the fibers in place on the silicon wafer. Ideally, if optical systems are to be used commercially, the system must be efficient and automated. Manual insertion and gluing of the fiber to the wafer is cumbersome and inefficient. Furthermore, an automated optical system must also be able to connect and communicate quickly and precisely with other components of that optical system.

Another problem with this method involves the couplers required to attach the optical fiber to the silicon wafer. In order to harness the output of the laser with the fiber using silicon couplers additional fabrication steps are necessary. For example, the difficult task of fabricating the silicon coupler must be completed. Then the lasers need to be fixed to the silicon coupler. Fixing the laser to the coupler requires separating the lasers on the wafer, placing them on the coupler and heating and cooling the solder to adhere the lasers to the coupler; all without damaging the lasers. Finally, the fibers have to be inserted and glued in position into the silicon coupler.

Additionally, the Holm's silicon coupling device has an optical coupling efficiency of ~90%. The 10% loss is mainly attributed to the free space between the laser and the fiber. Hence, reducing the gap should increase the coupling efficiency. So, either smaller gaps need to be in place or, ideally, the gap is eliminated entirely by bonding the fiber directly to the laser. However, reducing the gap remains a challenging problem.

What is needed is process in which a semiconductor laser in a silicon wafer is coupled to a fiber in a one step process performed directly on the silicon wafer. Such a one-step process would eliminate the need to separate laser arrays during fabrication, thereby reducing cost and unnecessary steps. What is also needed is a process for coupling the laser to the optical fiber such that the resultant communication is highly efficient and reliable.

INVENTION SUMMARY

The present invention enables optical fibers to bond to a substrate surface using a source of heat from a laser. The resultant mechanical and optical bond provides efficient and reliable data transfer and communication. As used herein, the term "substrate" refers to a functional component capable of functionality beyond merely transmitting light. For example, a substrate may be a laser or a silicon wafer. Substrates, as hereinafter referred to, do not include optical fibers.

More specifically, the present invention involves a process for melting an optical fiber with energy emitted from a laser. The molten fiber is then extended toward and applied with force to a substrate surface, where it bonds directly to the surface as it cools. The resultant bond is a direct bond between the optical fiber and the substrate surface. A direct bond, as used herein, refers to a mechanically and optically viable bond between an optical fiber and a substrate surface wherein no component other than the optical fiber and the substrate is a part of the bond. In other words, it is a functional junction formed solely between the optical fiber and the substrate; no external or internal coupling mechanisms or other mechanical devices are involved in the direct bond.

In one embodiment of the invention, a fiber bonding device comprises three main components: a fiber feeder, a capillary punch, and a fiber tip support. In another embodiment of the invention, the fiber bonding device is utilized with a laser that melts the optical fiber so that it can be bonded to a surface. A third embodiment of the invention comprises computer control logic for controlling a bonding process involving an optical fiber and the surface to which it will be bonded, and provides for an automated system and method.

The foregoing and other objects, features, and advantages of the present invention will be become apparent from a reading of the following detailed description of exemplary embodiments thereof, which illustrate the features and advantages of the invention in conjunction with references to the accompanying drawing Figures.

DETAILED DESCRIPTION OF THE PREFERRED EMBODIMENTS

Figure 1:
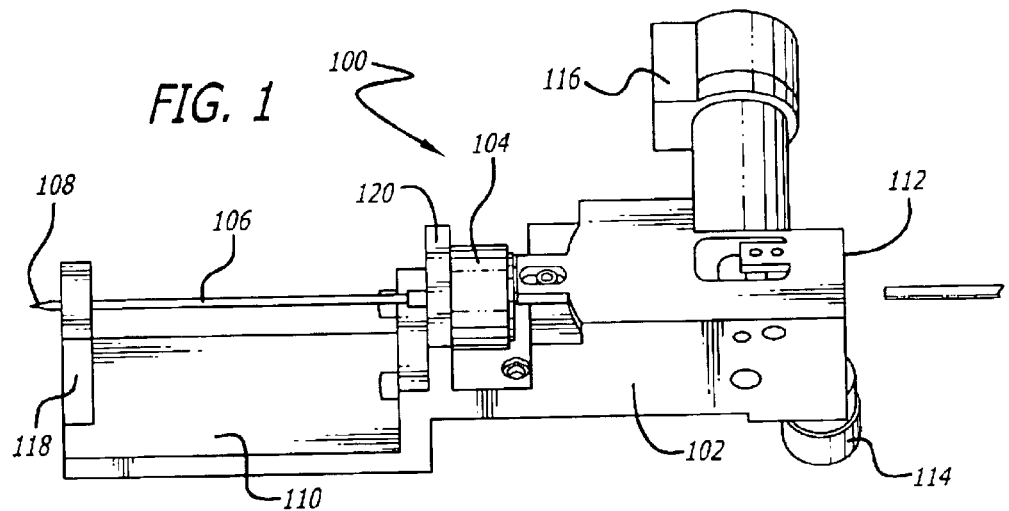
FIG. 1 illustrates a fiber bonding device according to a first exemplary embodiment of the invention.

In the following description of the preferred embodiments reference is made to the accompanying drawings which form a part thereof, and in which are shown by way of illustration specific embodiments in which the invention may be practiced. It is to be understood that other embodiments may be utilized and that structural and functional changes may be made without departing from the scope of the present invention.

The invention is directed to bonding an optical fiber to a surface using laser technology. In contrast to current optical systems that have connections comprising mechanical couplers or micromachined sleeves with the optical fibers inserted into holes using an adhesive, the present invention provides for connections in laser optical systems that are made directly to optical components. The direct connection of an optical fiber to a surface, in accordance with the teachings of the invention, does not include mechanical couplers, micromachined sleeves, adhesives, or any other connection mechanism. Rather, the direct connection is between the optical fiber and the surface, wherein the optical fiber and the surface have uninhibited contact and require no additional connection component or coupler device to sustain the optical or mechanical integrity of the bond. The bonded optical fiber therefore has a functional junction with the substrate surface. That is, light may be transferred through the bond, and the bond is a direct connection in the sense that no coupling mechanisms are included in the bond.

In general, methods and processes performed according to the invention involve focusing the energy emitted by a laser to melt the end of an optical fiber. This forms a region of molten material on the end of the optical fiber. The molten region is then extended, with some amount of force, to bring it into contact with a surface. The surface may be, for example, an optoelectronic or waveguide surface, including III–VI semiconductors and silicon, fused silica, and silicate glasses. The surface is also heated, although not melted. Rather, either with energy from the laser or with heat transferred through a mounting stage onto which the substrate is mounted, the substrate surface temperature is elevated to a point less than, but close to, its transition or melting point. The elevated temperature allows the molten optical fiber to be easily received and bonded thereto, without damaging the substrate.

After the optical fiber has been melted and the substrate surface has been heated, the molten region of the optical fiber is extended toward and makes contact with the substrate surface. When the molten optical fiber contacts the heated substrate surface, contact melting occurs between the optical fiber and the substrate surface. This thermal fusion results in a mechanical and optical bond, capable of retaining both its mechanical and optical integrity, without the use of other coupling or connection components. After thermal fusion occurs, the melted optical fiber and its contact surface are cooled, enducing resilification of the heat fused optical fiber and substrate. The resultant bond is a direct bond between the optical fiber and the surface. The process may be entirely controlled and automated by computers. This approach allows for complete automation of the packaging of optical systems.

FIG. 1 illustrates a fiber bonding device 100 according to one embodiment of the invention. Fiber bonding device comprises a fiber feeding unit 102, an alignment solenoid 104, and a fiber feeding support 106 having a alignment tip 108 at its end. Fiber feeding support 106 may be a support member along which an optical fiber can be supported or, alternatively, may be a tubular structure inside of which an optical fiber can be supported. Fiber feeding support 106 and alignment tip 108 are supported by a structural support member 110 connected to fiber feeding unit 102.

Fiber feeding unit 102 has an opening 112 at its end through which an optical fiber is inserted to be fed through fiber bonding device 100. A clamping solenoid 114 is operatively connected, via a rubber roller wheel, to a motor 116, such as a DC motor. Clamping solenoid 114 is a push-pull type solenoid that advances and retracts an optical fiber when it is pinched between clamping solenoid 114 and the rubber roller wheel, as powered by motor 116. Specifically, motor 116 can be actuated to advance or retract the fiber between clamping solenoid 114 and the rubber roller wheel connected to motor 116. As will be apparent to those skilled in the art, fiber feeding unit 102 with its motor 116 and clamping solenoid 114 allows a user to have control of the advancement and retraction of the optical fiber being passed therethrough.

Once a fiber has been passed through fiber feeding unit 102 and is positioned before alignment solenoid 104, the fiber is released such that it is no longer clamped between clamping solenoid 114 and the rubber roller wheel. To release the fiber, voltage is removed from clamping solenoid 114, such as by disengaging motor 116, and a small brass weight fixed to the free shaft of clamping solenoid 114 retracts the roller wheel from the motor shaft. The fiber is thus released, and is free to move with the actuation of alignment solenoid 104.

Alignment solenoid 104 is mounted and connected between fiber feeding unit 102 and fiber feeding support 106. Alignment solenoid 104 is a push-pull type solenoid, similar to clamping solenoid 114. Fiber feeding unit 102 may be attached to alignment solenoid 104 by threaded screws or bolts, for example. When actuated, alignment solenoid 104 generates force, which is transferred through fiber feeding unit 102 to alignment tip 108. This force adheres the fiber to a substrate as alignment tip 108, having a fiber end therein, is punched into the substrate surface.

Alignment tip 108 is connected to the front face of a vertical beam 118 attached to tip support 110. Attachment in this manner provides for stable support and, therefore, maximizes precision in placement of the fiber end into the substrate surface for bonding. Tip support 110 may be made of aluminum or any other low weight, high strength material, and provides structural support that prevents drifting of the tip that might otherwise be caused by the cantilever nature of fiber bonding device 100 or by shaking or resonance of fiber bonding device 100 caused by solenoid actuation. Vertical beam 118 supports fiber feeding support 106, which extends from a vertical support 120 connected to alignment solenoid 104. Due to the rigid structural support provided by tip support 110, vertical beam 118 and vertical support 120, alignment tip 108 is constrained in all directions except that of into the plane of a mounting substrate. In the exemplary embodiment, alignment tip 108 is ceramic, but it may be any hard material suitable for punching a fiber therein into a substrate surface.

As described above, fiber bonding device 100 is capable of feeding an optical fiber therethrough and positioning the end of the fiber within its alignment tip 108. Specifically, fiber bonding device 100 is used to feed the end portion of an optical fiber into the focal point of a laser, which causes the end portion to melt. At that point, fiber bonding device 100 causes the melted end portion to be bonded onto a substrate surface. This precision operation requires delicate positioning. To assist in the positioning of the optical fiber in relation to both the laser focal point and the substrate surface, a multidirectional stage is used, as described below with reference to FIG. 2.

Figure 2:
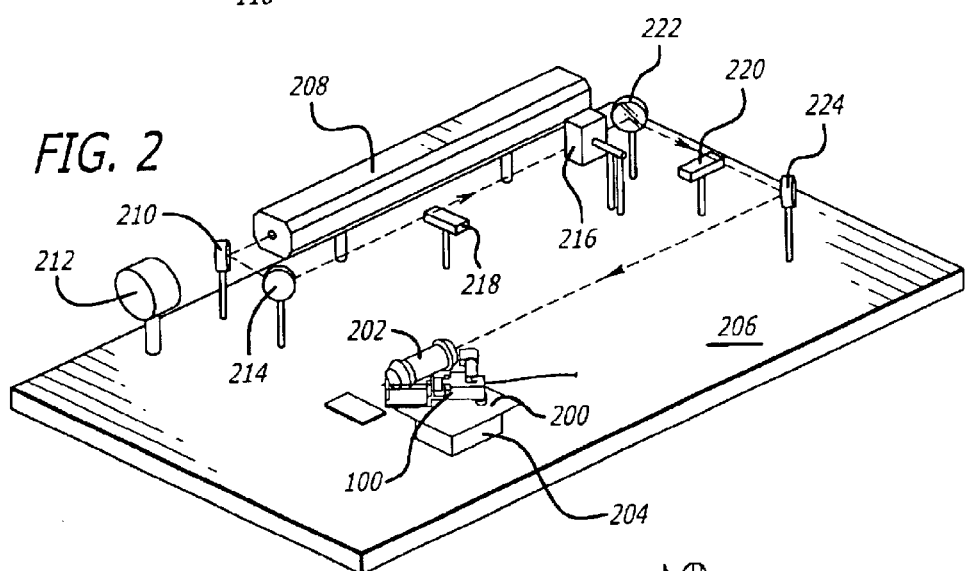
FIG. 2 illustrates a laboratory setup that may be used to employ an exemplary method embodiment of the invention.

FIG. 2 illustrates an exemplary fiber bonding setup, using previously described fiber bonding device 100. Fiber bonding device 100 is mounted to a multidirectional stage 200. Multidirectional stage 200 comprises a plurality of cross patterned stages upon which a rotational and tilt stage is mounted. Multidirectional stage 200 is therefore capable of fine positioning, because all degrees of freedom are accessible. A focusing lens 202 is mounted on a single directional stage 204. Multidirectional stage 200, having fiber bonding device 100 mounted thereon, is also mounted on single directional stage 204. This allows both focusing lens 202 and fiber bonding device 100 to be moved toward and away from a substrate surface upon which fiber bonding device 100 will bond an optical fiber. When using the exemplary fiber bonding setup illustrated in FIG. 2, the substrate upon which the optical fiber will be bonded is positioned in front of alignment tip 108 and adjacent the laser focal point created by focusing lens 202. Approximate distances for such a setup are 200 µm between the substrate and the laser focal point, and 300 µm between the substrate and alignment tip 108. However, various distances may be used, and the invention is not limited to any particular distance, as will be apparent to those skilled in the art.

A description of an exemplary method of the present invention will continue with reference to FIG. 2. The exemplary fiber bonding setup is created on an optics table 206, optics bench, or other stable surface suitable for precision operations. A laser 208, such as a $CO_2$ laser, is attached along one side of optics table 206 and produces a laser beam that has sufficient energy to melt the end of an optical fiber in preparation for bonding the fiber to a substrate surface. A mirror 210 allows a first portion of the laser beam to pass through it into an energy dump 212, while the remainder of the beam is reflected. In an exemplary embodiment, 30% of the laser beam may be dumped in this fashion, while the remaining 70% of the laser beam is reflected and used for the remaining steps of the method.

The reflected portion of the laser beam is directed by mirror 210 to a second mirror 214, which redirects the laser beam toward modulator 216. The beam passes through modulator 216, where it is converted from a continuous wave to pulses of specific length and intensity. As will be recognized by those skilled in the art, the appropriate length and intensity for the modulated pulses will vary according to the application. The pulse modulations control the diffusion time for heat transfer of the laser energy into the optical fiber that is to be melted. Although there is no unique value for the length and intensity of the modulated pulses in order to accomplish sufficient heat transfer to cause an optical fiber to melt, the approximate time scale is on the order of a few hundred milliseconds. As will be recognized by those skilled in the art, the laser intensity of the modulated pulse integrated over the cumulative number of pulses must provide sufficient energy to melt the fiber accounting for all heat transfer losses of energy into the fiber and, accordingly, will vary depending on the properties of the fiber. These values, for length and intensity of the modulated pulses, will be easily established by those skilled in the art performing the method of the present invention.

As the laser beam passes through modulator 216, a first beam dump 218 absorbs light reflected from the modulator and a second beam dump 220 absorbs light diffracted from the modulator. After passing through modulator 216, the modulated pulses are reflected by mirror 222 to a fourth mirror 224. Fourth mirror 224 is positioned to reflect and direct the modulated pulses into a beam expander and focusing lens 202. Beam expander and focusing lens 202 bring the beam of modulated pulses to a 24 µm spot, which is used to melt the fiber. Of course, other size spots are also possible for the intended purpose and are considered to be within the scope of the invention.

Finally, after the spot is established, fiber bonding device 100 feeds the end of an optical fiber into the spot and supports it while the modulated pulses of the laser, focused in a spot, cause the end of the fiber to melt, forming a molten region of fiber. Once the molten region of fiber is formed, alignment solenoid 104 is actuated and causes alignment tip 108 to force the molten region of fiber into a heated substrate surface. As described above, the heated substrate surface has a temperature that is close to, but less than, the transition or melting point of the substrate. The elevated temperature of the substrate may be caused either by energy from the laser beam or by heat transferred to the substrate from a heated stage upon which the substrate is mounted. Alignment tip 108 is then retracted by the push-pull type alignment solenoid 104, and the melted optical fiber remains in the substrate surface, where thermal fusion occurs between the optical fiber and the substrate surface. Upon cooling, resilification of the thermally fused optical fiber and substrate form a direct bond that is both mechanically and optically functional.

Figure 3:
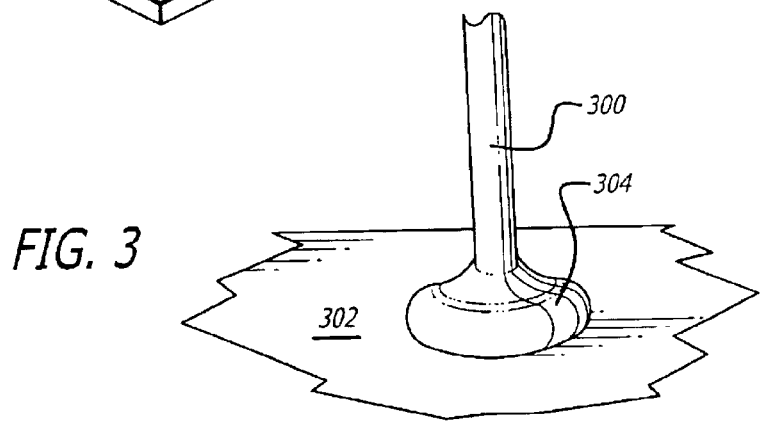
FIG. 3 illustrates a 50 µm optical fiber bonded to a glass surface by an exemplary method of the invention.

FIG. 3 illustrates an optical fiber that has been bonded to a surface using the laser process of the present invention. As illustrated in the figure, optical fiber 300 is adhered directly to surface 302 by bond 304. Bond 304 comprises a region of optical fiber 300 that was melted by a laser, extended into heated surface 302 with a fiber bonding device, and then allowed to cool.

The process and method described herein may, in an exemplary embodiment, be computer controlled. For example, laser 208 may be externally controlled with a CPU such that a user may adjust the laser output with a computer. Modulator 216 may be similarly controlled, such that the user can externally control, with a computer, the length and intensity of the modulated pulses.

In the exemplary computer controlled mode, the fiber bonding setup is controlled with software whose output causes a CPU to control the laser, modulator, fiber bonding device, and various positioning stages, and whose input is received by a user through, for example, a graphical user interface (GUI). The software may be written in any suitable computer programming language such as, for example, C. Using the GUI, the user causes the CPU to send digital output to a main controlling board. This board routes individual leads to various components of the system, such as laser 208, modulator 216, multidirectional stage 200, single directional stage 204, and fiber bonding device 100. For example, a signal can be sent to the stage motion controller, which moves the platform with fiber bonding device 100 and focusing lens 202 towards and away from the substrate surface. Using another command, signals can be sent to actuate clamping solenoid 114 or alignment solenoid 104. From the main board, a signal can also be sent to the DC motor control card, which instructs the motor 116 to feed or retract the fiber when clamping solenoid 114 is engaged.

Similarly, a signal can be sent from the main board to laser modulator 216, which will send a pulse train with preset parameters to the focusing lens, according to the method previously described. The exemplary computer controlled system also allows the user to turn the laser on and off as well as to set parameters for the laser pulse train, including pulse length and intensity, as previously described. Of course, other pulse train parameters that may be controlled by the user include pulse width, pulse period and number of bursts. The exemplary software can also be configured so as to cause the CPU to generate a set of commands with one keystroke by a user. This way, after a user sets up the parameters of a fiber bonding procedure, procedure is activated and performed upon a single keystroke by the user.

The foregoing description of the preferred embodiments of the invention has been presented for the purposes of illustration and description. It is not intended to be exhaustive or to limit the invention to the precise form disclosed. Many modifications and variations are possible in light of the above teaching. For example, lasers other than $CO_2$ may be used to provide energy sufficient to melt a fiber according to the present invention. Among other possibilities, the invention may be utilized to bond different sizes and types of optical fibers, to different types of substrate surfaces. The invention may be performed manually or with the assistance of a computer-controlled system. Also, the invention is not limited to the specific fiber bonding setup disclosed herein; rather different numbers and types of components in the setup may be used to achieve the method of the invention, and these varieties are considered to be within the scope of the present invention. It is intended that the scope of the invention be limited not by this detailed description, but rather by the claims appended hereto.

What is claimed is:

1. An optical fiber bonded to a substrate, comprising:

an optical fiber having an end region; and said end region of the optical fiber having a functional junction with a substrate, wherein the functional junction is formed solely between the end region of the optical fiber and the substrate surface, wherein said optical fiber is advanced or retracted by a fiber feeding unit, and wherein a multi-directional stage mounted beneath said fiber feeding unit moves in a plurality of directions positioning said optical fiber in relation to said substrate.

2. The optical fiber of claim 1 wherein the substrate is a semiconductor.

3. The optical fiber of claim 1 wherein the substrate is a vertical cavity surface emitting laser.

4. The method of claim 1 wherein the substrate is a functional component not limited to light transmission.

5. The method of claim 1 wherein the substrate comprises a material selected from a group consisting of silicon, fused silica and silicate glass.

6. An optical fiber bonded to a substrate, comprising:

an optical fiber having an end region; and said end region being bonded directly to a substrate without a coupling component;

wherein the optical fiber is advanced or retracted by a fiber feeding unit, and wherein a multi-directional stage mounted beneath said fiber feeding unit moves in a plurality of directions positioning said optical fiber in relation to said substrate.

7. A method for bonding an optical fiber to a substrate, the method comprising:

providing a laser beam having a focal point;

aligning a substrate adjacent the laser beam focal point;

extending an optical fiber along a support structure having an alignment tip;

extending one end of the optical fiber beyond the alignment tip of the support structure, into the laser beam focal point;

after the end of the optical fiber melts in the laser beam focal point, extending the melted end of the optical fiber together with the alignment tip of the support structure into the surface of the substrate;

moving at least one of the multi-directional stage and the support structure for aligning the focal point of a laser to said one end of the optical fiber; and retracting the alignment tip of the support structure such that the end of the optical fiber retains direct contact with the substrate.

8. The method of claim 7 further comprising hearing the substrate surface before the step of extending the melted end of the optical fiber together with the alignment tip of the support structure into the surface of the substrate.

9. The method of claim 7 wherein the support structure comprises a tubular support member; wherein the extending an optical fiber along a support structure comprises extending the optical fiber through the tubular support member; and wherein the alignment tip comprises a ceramic material.

10. The method of claim 7 wherein the providing a laser beam having a focal point comprises:

converting a continuous wave of the laser beam to pulses.

11. The method of claim 7 wherein the focal point comprises a spot having a diameter approximately between 20 $\mu$m and 30 $\mu$m.

12. The method of claim 7 wherein the extending one end of the optical fiber beyond the alignment tip, into the laser beam focal point, is controlled by a digital output of a computer processor.

13. A fiber bonding device using a laser light source and at least one lens for creating a focal point to heat an end of an optical fiber comprising;

a fiber feeding unit for routing an optical fiber;

a solenoid connected to the fiber feeding unit and having an opening for an optical fiber to pass through; and a hollow support member having a first end and a second end, the first end operatively connected to the solenoid and the second end having an alignment tip connected thereto; and the solenoid operable for feeding the optical fiber through the hollow support member.

14. A fiber bonding device utilizing focused laser light for heating an optical fiber comprising:

a fiber feeding unit for routing an optical fiber;

a first solenoid connected to the fiber feeding unit and having an opening for an optical fiber to pass through;

a hollow support member having a first end and a second end, the first end operatively connected to the solenoid and the second end having an alignment tip connected thereto;

the first solenoid operable for feeding the optical fiber through the hollow support member;

a motor, attached to the fiber feeding unit; and a second solenoid, operatively connected to the motor, for routing a fiber through the fiber feeding unit.

15. The fiber bonding device of claim 14 wherein the alignment tip comprises a ceramic material.

16. The fiber bonding device of claim 14 wherein the hollow support member comprises a tubular structure capable of having an optical fiber passed therethrough.

17. A fiber bonding device comprising:

a laser generating device having a laser beam that passes through a focusing lens;

a fiber feeding unit for routing an optical fiber;

a solenoid connected to the fiber feeding unit and having an opening for an optical fiber to pass through;

a hollow support member having a first end and a second end, the first end operatively connected to the solenoid and the second end having an alignment tip connected thereto;

the solenoid operable for feeding the optical fiber through the hollow support member;

a multi-directional stage mounted beneath the fiber feeding unit;

the focusing lens, mounted on the multi-directional stage; and the multi-directional stage, and the fiber feeding unit and focusing lens mounted thereon, movable in a plurality of directions.

18. An apparatus for bonding an optical fiber to a substrate, the apparatus comprising:

a laser generating device for generating a laser beam;

a mirror for directing the laser beam through a modulator for converting the laser beam from a continuous wave to a pulse train;

a focusing lens for focusing the converted laser beam into a focal point; and a fiber bonding device mounted on a multi-directional stage movable in a plurality of directions for directing an end of an optical fiber into the focal point such that the end of the optical fiber melts and for causing the melted end of the optical fiber to extend toward and bond to the surface of a substrate.

19. An apparatus for bonding an optical fiber to a substrate, the apparatus comprising:

a laser generating device for generating a laser beam;

a first mirror for passing a first portion of the laser beam therethrough and reflecting a second portion of the laser beam;

an energy sink for collecting the first portion of the laser beam;

a second mirror for directing die second portion of the laser beam through a modulator for converting the second portion of the laser beam from a continuous wave to a pulse train;

a focusing lens for focusing the converted second portion of the laser beam into a focal point; mid a fiber bonding device mounted on a multi-directional stage movable in a plurality of directions for directing an end of an optical fiber into the focal point such that the end of the optical fiber melts and for causing the melted end of the optical fiber to extend toward and bond to the surface of a substrate.

20. The apparatus of claim 19 further comprising a third mirror for directing the converted second portion of the laser beam through the focusing lens.

21. The apparatus of claim 19 further comprising:

a third mirror for reflecting the converted second portion of the laser beam; and a fourth mirror for directing the reflected, converted second portion of the laser beam through the focusing lens.

22. The apparatus of claim 19 wherein the first portion of the laser beam comprises approximately 30% of the laser beam.

23. The apparatus of claim 19 wherein the laser beam generating device is a $CO_2$ laser.

24. The apparatus of claim 19 wherein the laser beam comprises a continuous wave.

25. The apparatus of claim 19 wherein the modulator converts the laser beam from a continuous wave to a pulse wave.

* * * * *